(12) United States Patent
Hagiwara

(10) Patent No.: US 10,955,642 B2
(45) Date of Patent: Mar. 23, 2021

(54) LENS DRIVING DEVICE, CAMERA DEVICE, AND ELECTRONIC APPARATUS

(71) Applicant: New Shicoh Motor Co., Ltd., Zhejiang (CN)

(72) Inventor: Kazuyoshi Hagiwara, Kanagawa (JP)

(73) Assignee: New Shicoh Motor Co., Ltd., Zhejiang (CN)

( * ) Notice: Subject to any disclaimer, the term of this patent is extended or adjusted under 35 U.S.C. 154(b) by 147 days.

(21) Appl. No.: 16/151,386

(22) Filed: Oct. 4, 2018

(65) Prior Publication Data

US 2019/0121053 A1  Apr. 25, 2019

(30) Foreign Application Priority Data

Oct. 23, 2017  (JP) .............................. JP2017-204597

(51) Int. Cl.
*G02B 15/14* (2006.01)
*G02B 7/10* (2006.01)
(Continued)

(52) U.S. Cl.
CPC ................ *G02B 7/10* (2013.01); *G02B 7/08* (2013.01); *G02B 7/102* (2013.01);
(Continued)

(58) Field of Classification Search
CPC . G02B 7/102; G02B 7/10; G02B 7/08; G02B 15/14; G02B 15/177; G02B 27/646;
(Continued)

(56) References Cited

U.S. PATENT DOCUMENTS

2007/0195438 A1* 8/2007 Paik .................. G02B 7/102
359/824
2008/0253003 A1* 10/2008 Shin ................... G02B 7/102
359/824
(Continued)

FOREIGN PATENT DOCUMENTS

JP  2009217051 A  *  9/2000
JP  2009-217051        9/2009
(Continued)

OTHER PUBLICATIONS

Office action in corresponding Japanese application No. 2017-204597, dated Jul. 22, 2019, and English Translation.
(Continued)

*Primary Examiner* — William R Alexander
*Assistant Examiner* — Tamara Y. Washington
(74) *Attorney, Agent, or Firm* — Fildes & Outland, P.C.

(57) ABSTRACT

A lens driving device (12) includes a lens support (20) configured to support a lens, a frame member (22) surrounding a periphery of the lens support (20), and a support mechanism (38) configured to support the lens support (20) so as to be freely movable relative to the frame member (22) in a direction orthogonal to an optical axis direction of the lens. The support mechanism (38) includes a support portion (44, 48) and a guiding portion (46, 50). The support portion (44, 48) and the guiding portion (46, 50) extend in the direction orthogonal to the optical axis direction of the lens, and the support portion (44, 48) is in contact with the guiding portion (46, 50) at least at two points in a cross section in the optical axis direction of the lens.

20 Claims, 15 Drawing Sheets

(51) Int. Cl.
*G02B 13/00* (2006.01)
*H04N 5/225* (2006.01)
*G02B 7/08* (2006.01)
*H02K 41/035* (2006.01)
*G02B 27/64* (2006.01)

(52) U.S. Cl.
CPC ..... *G02B 13/0015* (2013.01); *H02K 41/0356* (2013.01); *H04N 5/2253* (2013.01); *H04N 5/2254* (2013.01); *G02B 27/646* (2013.01)

(58) Field of Classification Search
CPC .......... G03B 3/10; G03B 17/04; G03B 17/00; G03B 13/36; G03B 13/009; G03B 2205/0007; G03B 2205/0084; G03B 2205/0046; G03B 13/0015; H04N 5/2253; H04N 5/2254; H02K 41/0356
USPC ....................................................... 359/694
See application file for complete search history.

(56) References Cited

U.S. PATENT DOCUMENTS

2015/0049209 A1 2/2015 Hwang et al.
2017/0139225 A1 5/2017 Lim
2017/0285443 A1* 10/2017 Hu ..................... G02B 27/646

FOREIGN PATENT DOCUMENTS

JP 2009217051 A * 9/2009
JP 2010-009666 1/2010
JP 2017-090887 5/2017

OTHER PUBLICATIONS

English language abstract of JP 2009-217051.
English language abstract of JP 2010-009666.
Office action in related Japanese application No. 2019-220557, dated Nov. 4, 2020, and English Translation.

* cited by examiner

LENS DRIVING DEVICE, CAMERA DEVICE, AND ELECTRONIC APPARATUS

TECHNICAL FIELD

The present invention relates to a lens driving device, a camera device, and an electronic apparatus.

BACKGROUND ART

A small-sized camera is mounted on an electronic apparatus, e.g., a mobile phone or a smart phone. As this type of small-sized camera, for example, as disclosed in US 2015/049209, there is known a small-sized camera having an image stabilization function.

SUMMARY

Problems to be Solved by the Invention

In US 2015/049209, the camera includes a lens support configured to support a lens, and a frame member surrounding a periphery of the lens support. In order to support the lens support so as to be freely movable in a direction orthogonal to an optical axis direction of the lens relative to the frame member, a plurality of balls are used. Further, the related-art lens driving device includes a magnet and a magnetic member provided so as to be opposed to the magnet. An attraction force generated between the magnet and the magnetic member causes the balls to be sandwiched between the lens support and the frame member.

However, when a force larger than the attraction force between the magnet and the magnetic member is applied due to, for example, falling, the lens support may be separated from the balls, and then the lens support may hit the balls again. The frame member that is brought into point contact with the balls receives the impact, and thus there have been problems in that a dent or a crack may occur in a ball hitting part and smooth movement of the lens support may not be ensured.

The present invention has been made to solve the above-mentioned problems in the related art, and has an object to provide a lens driving device, a camera device, and an electronic apparatus, which are capable of ensuring smooth movement of a lens support.

Means for Solving the Problem

In one aspect of the present invention is a lens driving device. The lens driving device includes: a lens support configured to support a lens; a frame member surrounding a periphery of the lens support; and a support mechanism configured to support the lens support so as to be freely movable relative to the frame member in a direction orthogonal to an optical axis direction of the lens, the support mechanism including a support portion and a guiding portion, the support portion and the guiding portion extending in the direction orthogonal to the optical axis direction of the lens, the support portion being in contact with the guiding portion at least at two points in a cross section in the optical axis direction of the lens.

Preferably, the support mechanism includes a first support mechanism provided on one side in the optical axis direction of the lens, and a second support mechanism provided on another side in the optical axis direction of the lens. The first support mechanism includes a first support portion and a first guiding portion. The second support mechanism includes a second support portion and a second guiding portion. The first support portion and the first guiding portion extend in one direction orthogonal to the optical axis direction of the lens. The second support portion and the second guiding portion extend in a direction orthogonal to the optical axis direction of the lens and orthogonal to the first support portion and the first guiding portion.

Preferably, the support portion and the guiding portion are at least partially in surface contact with each other in the direction orthogonal to the optical axis direction of the lens.

Preferably, the support portion and the guiding portion are configured so that the support portion is in line contact with at least a part of the guiding portion in the direction orthogonal to the optical axis direction of the lens.

Preferably, the support portion and the guiding portion are configured so that the support portion is in line contact with the guiding portion at three positions in the direction orthogonal to the optical axis direction of the lens.

Preferably, a lens driving device further includes: a magnet provided in the lens support; and a magnetic member provided in the frame member and opposed to the magnet.

Another aspect of the present invention is a lens driving device. The lens driving device includes: a lens support configured to support a lens; a first frame member surrounding a periphery of the lens support; an orthogonal-direction support mechanism configured to support the lens support so as to be freely movable relative to the first frame member in a direction orthogonal to an optical axis direction of the lens; a second frame member surrounding the first frame member; and an optical axis-direction support mechanism configured to support the lens support and the first frame member so as to be freely movable in the optical axis direction of the lens, the orthogonal-direction support mechanism including a support portion and a guiding portion, the support portion and the guiding portion extending in the direction orthogonal to the optical axis direction of the lens, the support portion being in contact with the guiding portion at least at two points in a cross section in the optical axis direction of the lens.

Preferably, the optical axis-direction support mechanism includes a second frame member-side support portion provided in the second frame member and a first frame member-side guiding portion provided in the first frame member. The second frame member-side support portion extends in the optical axis direction of the lens. The second frame member-side support portion is in contact with the first frame member-side guiding portion at least at two points in a cross section in the direction orthogonal to the optical axis direction of the lens.

Another aspect of the present invention is a camera device. The camera device includes: the lens driving device of the above aspects; and a lens supported by the lens support.

Another aspect of the present invention is an electronic apparatus. The electronic apparatus includes the camera device of the above aspect.

Advantageous Effect

According to the present invention, the support portion and the guiding portion extend in the direction orthogonal to the optical axis direction of the lens, and the support portion is in contact with the guiding portion at least at two points in the cross section in the optical axis direction of the lens. Therefore, the lens support or the frame member receives less impact in the optical axis direction of the lens, and the smooth movement of the lens support can be ensured.

EXEMPLARY EMBODIMENT OF THE PRESENT INVENTION

Embodiments of the present invention are described with reference to the drawings.

FIG. 1 to FIG. 10 are illustrations of a first embodiment of the present invention.

Figure 1:
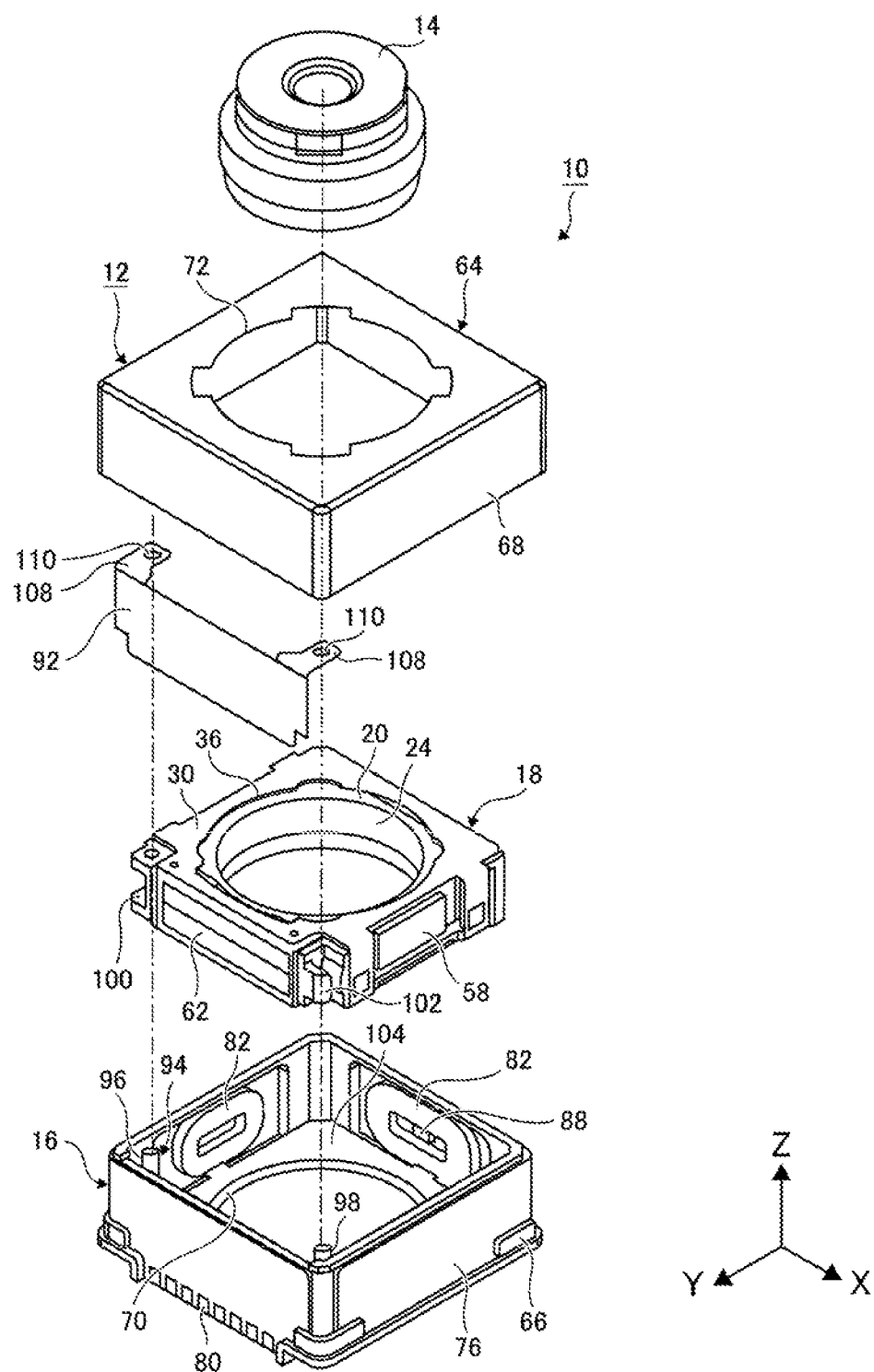
FIG. 1 is an exploded perspective view for illustrating a camera device according to a first embodiment of the present invention as viewed obliquely from above.

FIG. 1 is an illustration of a camera device 10 according to the first embodiment of the present invention. The camera device 10 includes a lens driving device 12 and a lens 14 mounted to the lens driving device 12.

Figure 2:
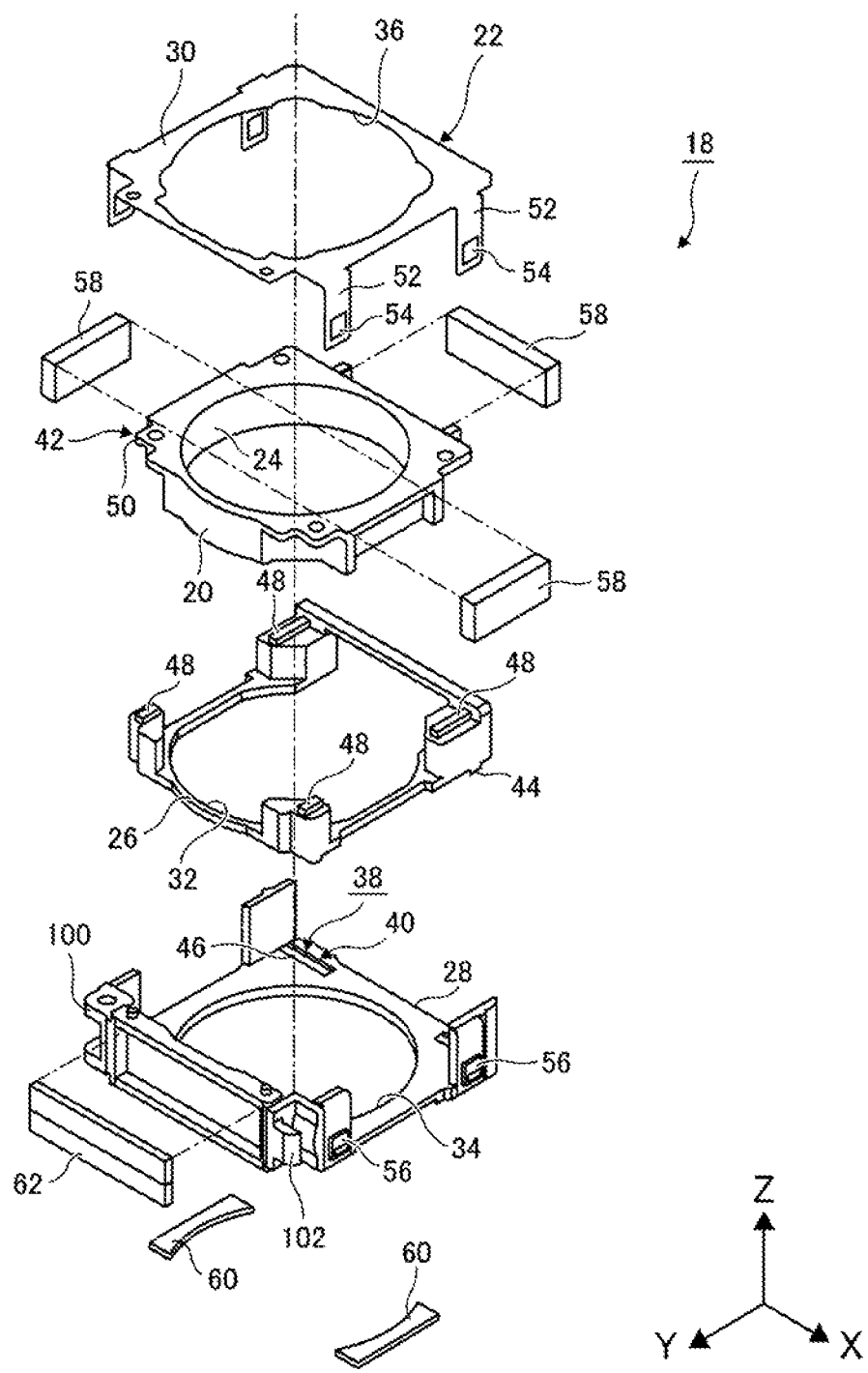
FIG. 2 is an exploded perspective view for illustrating a moving member used in the camera device according to the first embodiment of the present invention as viewed obliquely from above.
Figure 3:
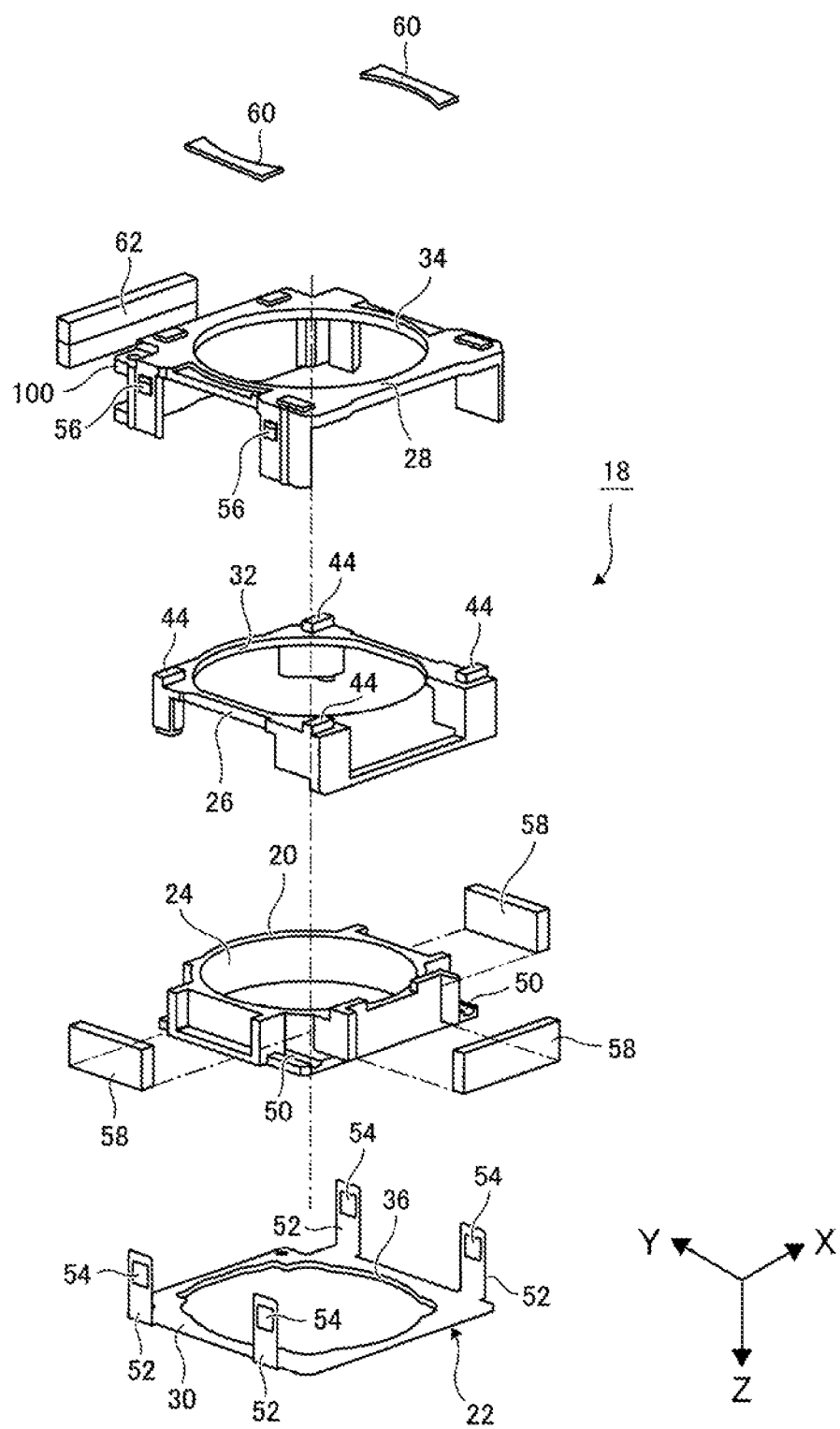
FIG. 3 is an exploded perspective view for illustrating the moving member used in the camera device according to the first embodiment of the present invention as viewed obliquely from below.

The lens driving device 12 includes a fixed member 16 and a moving member 18 supported so as to be freely movable relative to the fixed member 16. As illustrated in FIG. 2 and FIG. 3, the moving member 18 includes a lens support 20 and a first frame member 22 surrounding the lens support 20. The lens support 20 and the first frame member 22 each have a substantially quadrangular outer shape as viewed from above.

For the sake of convenience, an optical axis direction of the lens 14 is herein referred to as "Z direction", a direction orthogonal to the optical axis direction is referred to as "X direction", and a direction orthogonal to the Z direction and the X direction is referred to as "Y direction". Further, an object side of an optical axis is referred to as "upper side", and a side which is opposite to the upper side and on which an image sensor (not shown) is to be arranged is referred to as "lower side".

The lens support 20 has a lens mounting hole 24. The lens mounting hole 24 has a circular shape as viewed from the Z direction and is formed on the inner side of the lens support 20. The lens 14 is mounted to the lens mounting hole 24.

The first frame member 22 includes a first moving member plate 26, a second moving member plate 28, and a first cover 30. The lens support 20, the first moving member plate 26, and the second moving member plate 28 are each made of engineering plastics such as liquid crystal polymer (LCP), polyacetal, polyamide, polycarbonate, modified polyphenylene ether, and polybutylene terephthalate. Further, the first cover 30 is made of, for example, a metal. The first moving member plate 26, the second moving member plate 28, and the first cover 30 have openings 32, 34, and 36, respectively, for allowing passage of light therethrough. The openings 32, 34, 36 are each formed in a substantially circular shape.

The first frame member 22 supports the lens support 20 so as to be freely movable in the Y direction and the X direction. That is, the first frame member 22 includes an orthogonal-direction support mechanism 38, and is configured so that the lens support 20 is freely movable in XY directions via the orthogonal-direction support mechanism 38.

Figure 6:
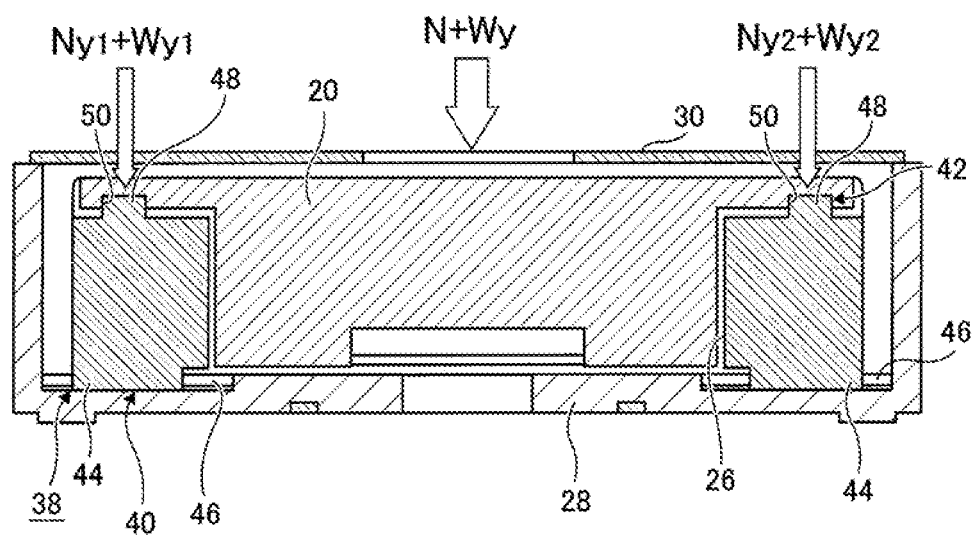
FIG. 6 is an X-direction sectional view for illustrating the moving member used in the camera device according to the first embodiment of the present invention.
Figure 7:
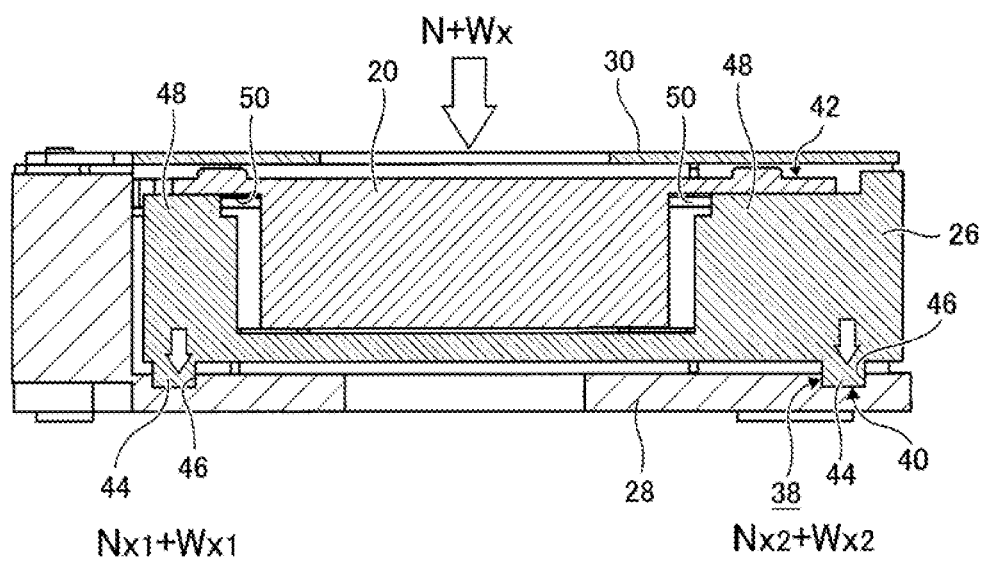
FIG. 7 is a Y-direction sectional view for illustrating the moving member used in the camera device according to the first embodiment of the present invention.

The orthogonal-direction support mechanism 38 includes a first support mechanism 40 and a second support mechanism 42 that are provided away from each other in the Z direction. The first support mechanism 40 is provided on the lower side in the Z direction, and as illustrated in FIG. 6 and FIG. 7, includes a first support portion 44 formed so as to protrude on a lower surface of the first moving member plate 26 and a first guiding portion 46 formed so as to be recessed in an upper surface of the second moving member plate 28. The first support portion 44 is fitted to the first guiding portion 46. The first support portion 44 and the first guiding portion 46 extend in the X direction, and are formed in the vicinity of each of four corner portions of the first moving member plate 26 and the second moving member plate 28. The first support portion 44 and the first guiding portion 46 extending in the X direction are fitted to each other so as to regulate movement in the Y direction, and hence the first moving member plate 26 is freely movable only in the X direction relative to the second moving member plate 28. The first support portion 44 and the first guiding portion 46 are surrounded by three orthogonal lines in a cross section (see FIG. 7) taken along the Z direction in the Y direction, and are brought into surface contact with each other in three planes (opposed side surfaces and lower surface) in the X direction.

The second support mechanism 42 is provided on the upper side in the Z direction, and as illustrated in FIG. 6 and FIG. 7, includes a second support portion 48 formed so as to protrude on an upper surface of the first moving member plate 26 and a second guiding portion 50 formed so as to be recessed in a lower surface of the lens support 20. The second support portion 48 is fitted to the second guiding portion 50. The second support portion 48 and the second guiding portion 50 extend in the Y direction, and are formed in the vicinity of each of four corner portions of the lens support 20 and the first moving member plate 26. The second support portion 48 and the second guiding portion 50 extending in the Y direction are fitted to each other so as to regulate movement in the X direction, and hence the lens support 20 is freely movable only in the Y direction relative to the first moving member plate 26. The second support portion 48 and the second guiding portion 50 are surrounded by three orthogonal lines in a cross section (see FIG. 6) taken along the Z direction in the X direction, and are brought into surface contact with each other in three planes (opposed side surfaces and upper surface) in the X direction.

At each of four corners of the first cover 30, a mounting portion 52 is provided so as to extend downward in the Z direction. The mounting portion 52 has a quadrangular mounting hole 54. Further, at each of four corners of the second moving member plate 28, a mounted portion 56 is formed so as to laterally protrude. The mounted portion 56 is fitted to the mounting hole 54, so that the first cover 30 is fixed to the second moving member plate 28. Between a lower surface of the first cover 30 and the upper surface of the lens support 20, as illustrated in FIG. 6 and FIG. 7, there is ensured a necessity minimum gap including an error caused by a tolerance or the like so as to regulate movement of the lens support 20 or the first moving member plate 26 in the Z direction relative to the second moving member plate 28.

On the outer side of the lens support 20, first magnets 58 are fixed on two surfaces in the X direction and one surface in the Y direction. Each of the first magnets 58 and 58 on the two surfaces in the X direction has an S pole and an N pole formed in the X direction. Further, the first magnet 58 on the one surface in the Y direction has an S pole and an N pole formed in the Y direction.

Further, on two surfaces in the X direction in a lower surface of the second moving member plate 28, first magnetic members 60 and 60 made of a magnetic substance are provided. The first magnetic members 60 and 60 are opposed in the Z direction to the first magnets 58 and 58 on the two surfaces in the X direction through intermediation of the second moving member plate 28. An attraction force is generated between the first magnetic members 60 and 60 and the first magnets 58 and 58. Therefore, the lens support 20 and the first moving member plate 26 are attracted through intermediation of the second moving member plate 28, and Z-direction contact is maintained between the first support portion 44 and the first guiding portion 46 and between the second support portion 48 and the second guiding portion 50.

Further, on the second moving member plate 28, a second magnet 62 is fixed on an outer surface on the opposite side of the surface on which the first magnet 58 is provided in the Y direction. The second magnet 62 is divided into two pieces in the Z direction. Each of the two pieces has an S pole and an N pole formed in the Y direction, and opposite polarities are provided in the vertical direction.

Next, a relationship between the fixed member 16 and the moving member 18 is described.

Referring back to FIG. 1, the fixed member 16 includes a second frame member 64. The second frame member 64 surrounds the periphery of the first frame member 22 of the moving member 18. The second frame member 64 includes a base 66 and a second cover 68. Each of the base 66 and the second cover 68 is made of a resin or a non-magnetic metal, and has a square shape as viewed from above. The second cover 68 is fitted to the outer side of the base 66 to form the second frame member 64. Further, the base 66 and the second cover 68 have through holes 70 and 72, respectively, for allowing passage of light or insertion of the lens 14 therethrough.

Figure 4:
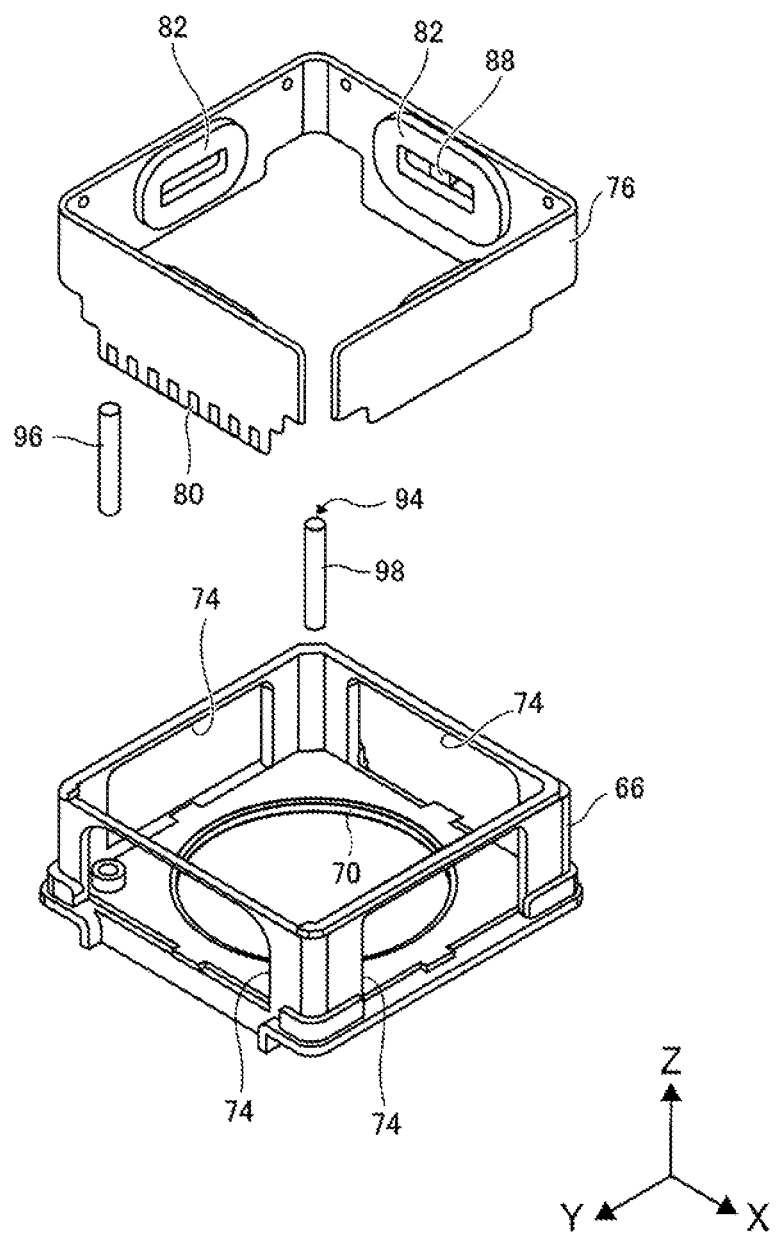
FIG. 4 is an exploded perspective view for illustrating a part of a fixed member used in the camera device according to the first embodiment of the present invention as viewed obliquely from above.
Figure 5:
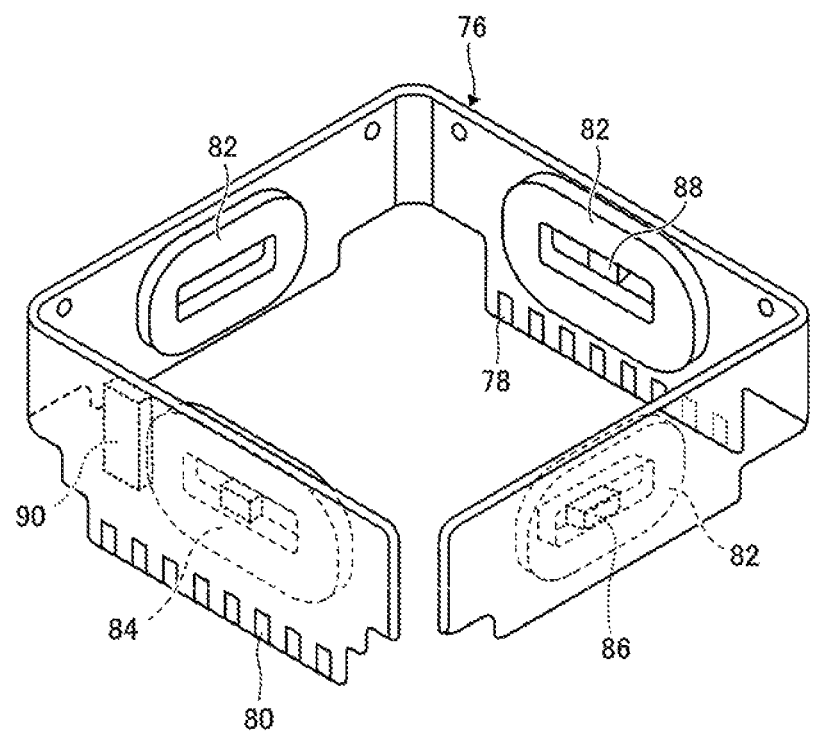
FIG. 5 is a perspective view for illustrating a flexible printed board used in the camera device according to the first embodiment of the present invention.

Further, as illustrated in FIG. 4, an opening portion 74 is formed through each of four side surfaces of the base 66. A flexible printed board 76 is arranged so as to surround the outer side of the base 66 and surround the opening portions 74. That is, as illustrated in FIG. 4 and FIG. 5, the flexible printed board 76 is bent into a quadrangular shape so as to surround the outer shape of the base 66, and at a lower portion of the flexible printed board 76, a first terminal portion 78 and a second terminal portion 80 are formed. The second terminal portion 80 is opposed to the first terminal portion 78 in the Y direction. Energization to a first coil 82 to be described later is controlled via the first terminal portion 78, and energization to a second coil 84 to be described later is controlled via the second terminal portion 80, but the present invention is not limited thereto.

On the inner side of the flexible printed board 76, the first coils 82 are fixed on two surfaces in the X direction and one surface in the Y direction. Further, the second coil 84 is fixed on another surface in the Y direction on the inner side of the flexible printed board 76. Further, on the inner side of the flexible printed board 76, an X-direction position detecting element 86 is arranged inside one first coil 82 in the X direction, a Y-direction position detecting element 88 is arranged inside the first coil 82 in the Y direction, and a Z-direction position detecting element 90 is arranged on the lateral side of the second coil 84.

The first coils 82 and 82 provided on the two surfaces in the X direction are electrically connected to each other in series.

The first coils 82, the X-direction position detecting element 86, and the Y-direction position detecting element 88 face the inner side of the base 66 through the opening portions 74, and are opposed to the first magnets 58. Similarly, the second coil 84 and the Z-direction position detecting element 90 face the inner side of the base 66 through the opening portion 74, and are opposed to the second magnet 62.

Further, as illustrated in FIG. 1, on the outer side of the flexible printed board 76, a second magnetic member 92 made of a magnetic substance is provided. The second magnetic member 92 is opposed to the second magnet 62 through intermediation of the flexible printed board 76 and the second coil 84. Magnetic fluxes from the second magnet 62 flow through the second magnetic member 92 so that an attraction force is generated between the second magnet 62 and the second magnetic member 92. Therefore, in the moving member 18, an attraction force acts in the Y direction of the fixed member 16.

As illustrated in FIG. 1 and FIG. 8 to FIG. 10, the moving member 18 is supported by an optical axis-direction support mechanism 94 so as to be freely movable relative to the fixed member 16 in the Z direction. The optical axis-direction support mechanism 94 includes a third support portion 96 and a fourth support portion 98 provided in the second frame member 64, and a third guiding portion 100 and a fourth guiding portion 102 formed in the moving member 18. The third support portion 96 and the third guiding portion 100 are combined with each other, and the fourth support portion 98 and the fourth guiding portion 102 are combined with each other.

Each of the third support portion 96 and the fourth support portion 98 is made of, for example, a ceramic, a metal, or a resin, and in the first embodiment, is formed as a column extending in the Z direction. Further, the third support portion 96 and the fourth support portion 98 are provided away from each other in the X direction in the vicinity of corner portions of the base 20 on a side-surface inner side on the second magnet 62 side of the base 66.

Each of the third support portion 96 and the fourth support portion 98 has a circular shape in an XY-direction cross section, but may have a shape of a part of a circle, or an oval or polygonal shape other than the circular shape.

That is, as illustrated in FIG. 1 and FIG. 8 to FIG. 10, a bottom surface portion 104 is formed around the through hole 70 of the base 60, and lower fixing portions 106 and 106 are formed on both sides on the inner side of the bottom surface portion 104 as cylindrical grooves. Lower ends of the third support portion 96 and the fourth support portion 98 are inserted and fixed to the lower fixing portions 106 and 106. Further, upper ends of the above-mentioned second magnetic member 92 at both ends in the X direction are bent in the Y direction to form upper fixing portions 108 and 108. Upper ends of the third support portion 96 and the fourth support portion 98 are inserted and fixed to insertion holes 110 and 110 formed in the upper fixing portions 108 and 108 so that the third support portion 96 and the fourth support portion 98 are fixed to the second frame member 64. In the first embodiment, the second magnetic member 92 also has a support function for the third support portion 96 and the fourth support portion 98, and thus the number of components can be reduced as compared to a case in which components for support are separately provided. Further, the third support portion 96 and the fourth support portion 98 can be stably supported.

Figure 8:
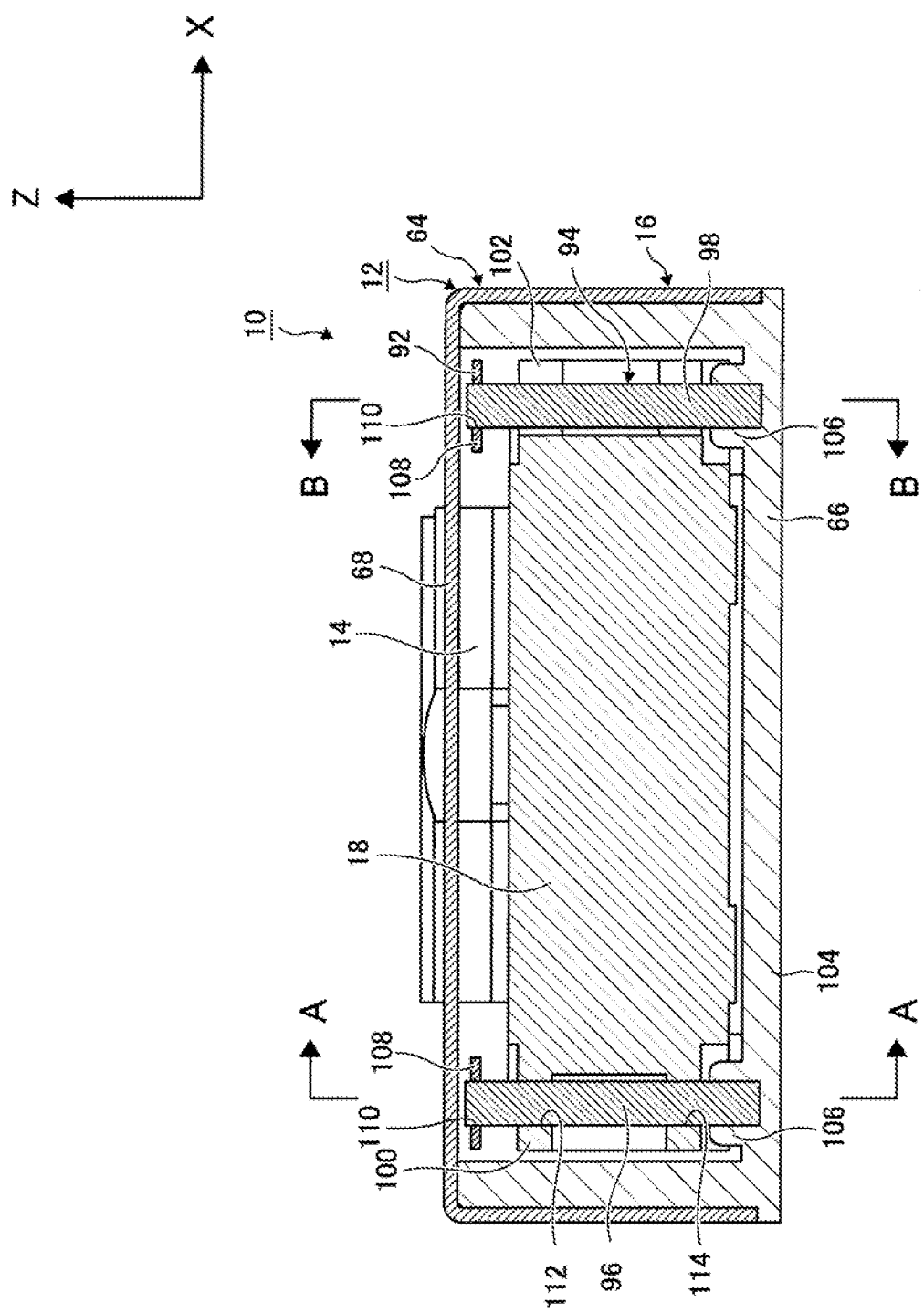
FIG. 8 is a sectional view for illustrating the camera device according to the first embodiment of the present invention.
Figure 9:
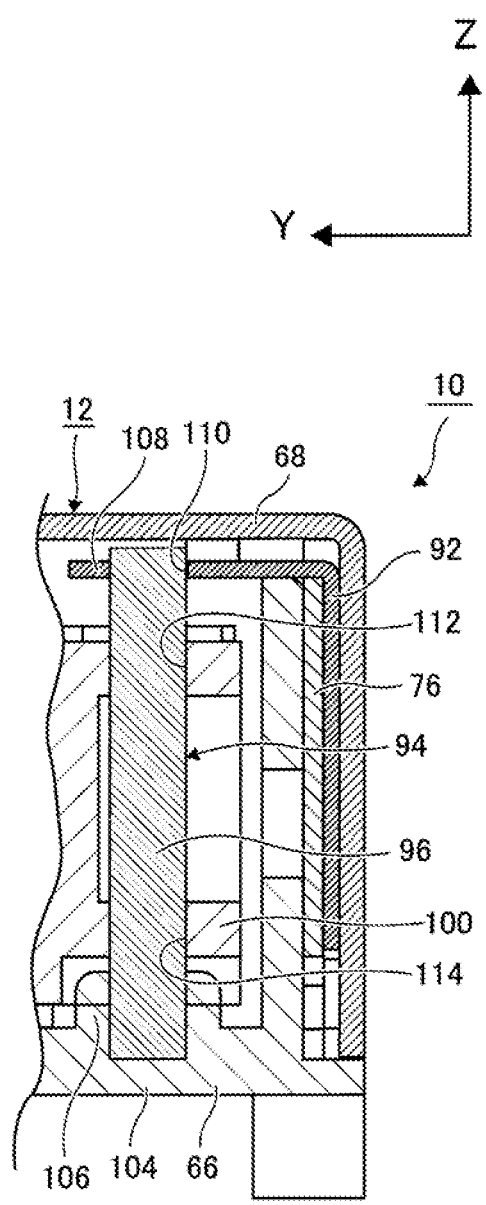
FIG. 9 is a sectional view for illustrating the camera device according to the first embodiment of the present invention, which is taken along the line A-A of FIG. 8.

As illustrated in FIG. 8 and FIG. 9, the third guide portion 100 includes a first contact portion 112 and a second contact portion 114 formed away from each other in the Z direction. In the first embodiment, the first contact portion 112 and the second contact portion 114 are formed as circular holes, and are brought into contact with an outer surface of the third support portion 96 in a 360-degree circumferential direction in the XY-direction cross section of the third support portion 96.

Figure 10:
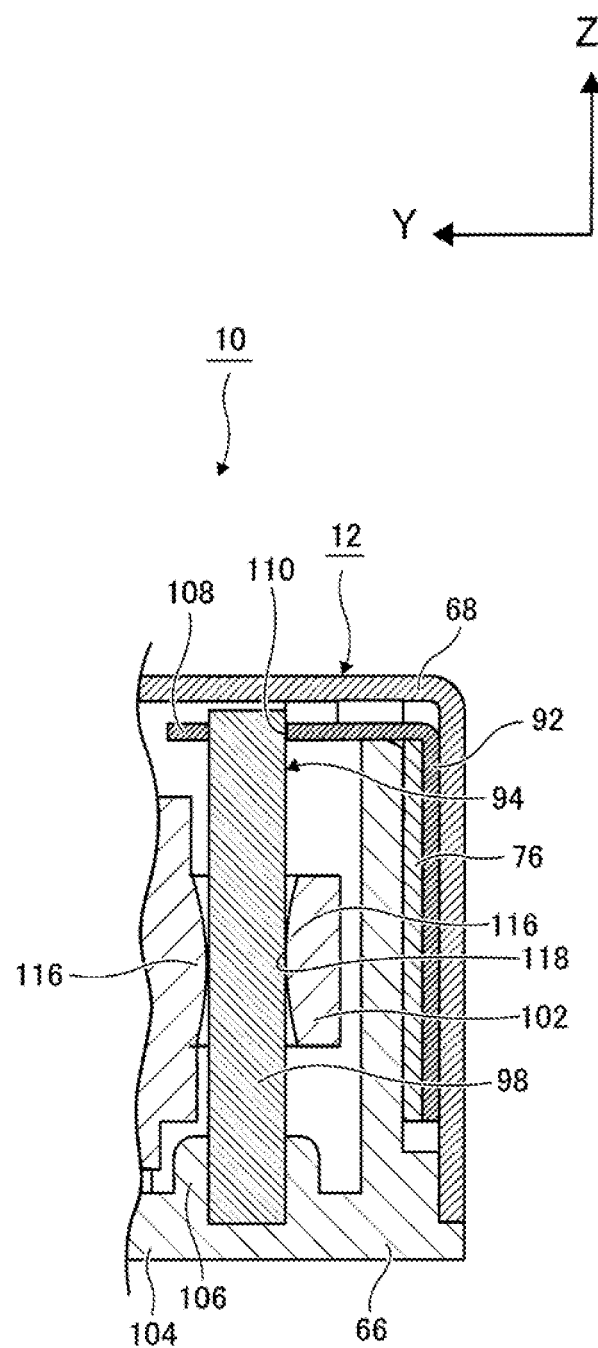
FIG. 10 is a sectional view for illustrating the camera device according to the first embodiment of the present invention, which is taken along the line B-B of FIG. 8.

As illustrated in FIG. 8 and FIG. 10, in the XY-direction cross section, the fourth guide portion 102 is formed of two wall surfaces opposed to each other in the Y direction. Both the wall surfaces of the fourth guide portion 102 protrude as a curve toward the fourth support portion 98 to form protruding portions 116 and 116. Middles of the protruding portions 116 and 116 correspond to a third contact portion 118 that is brought into contact with the fourth support portion 98. The third contact portion 118 is brought into contact with the fourth support portion 98 at two points in the Y direction to reduce a frictional resistance.

In the above-mentioned configuration, with energization to the first coils 82 and 82 opposed to the first magnets 58 and 58 on the two surfaces in the X direction in which magnetic fluxes in the Z direction are interposed, currents flow through the first coils 82 and 82 in the Y direction, and a Lorentz force acts on the first coils 82 and 82 in the X direction by the Fleming's left hand rule. The first coils 82 and 82 are fixed to the base 66, and hence the lens support 20 and the first moving member plate 26 move in the X direction while being supported by the first support mechanism 40 with a reaction force acting on the first magnets 58 and 58 serving as a drive force for the lens support 20 and the first moving member plate 26.

In this case, as illustrated in FIG. 7, when the drive force in the X direction is represented by $F_x$, the following expression may be satisfied to drive the lens support 20 and the second moving member plate 28 in the X direction:

$$F_x > \mu_{x1}(N_{x1}+W_{x1}) + \mu_{x2}(N_{x2}+W_{x2}).$$

In the expression, $\mu_{x1}$ and $\mu_{x2}$ each represent a friction coefficient between the first support portion 44 and the first guiding portion 46. $W_{x1}$ and $W_{x2}$ each represent a load to be applied to the first support portion 44, and $N_{x1}$ and $N_{x2}$ each represent a force to be applied to the first support portion 44 due to the attraction force between the first magnets 58 and 58 and the first magnetic members 60 and 60. Further, the following expression may be satisfied:

$$N+W_x = (N_{x1}+W_{x1}) + (N_{x2}+W_{x2}),$$

and $F_x$ can be represented as follows:

$$F_x = \mu_x(N+W_x),$$

provided that $\mu_x$ is an average value of $\mu_{x1}$ and $\mu_{x2}$.

Further, with energization to the first coil 82 opposed to the first magnet 58 in the Y direction in which magnetic fluxes in the Z direction are interposed, currents flow through the first coil 82 in the X direction, and a Lorentz force acts on the first coil 82 in the Y direction by the Fleming's left hand rule. The first coil 82 is fixed to the base 66, and hence the lens support 20 moves in the Y direction while being supported by the second support mechanism 42 with a reaction force acting on the first magnet 58 serving as a drive force for the lens support 20.

In this case, as illustrated in FIG. 6, when the drive force in the X direction is represented by $F_y$, the following expression may be satisfied to drive the lens support 20 in the Y direction:

$$F_y > \mu_{y1}(N_{y1}+W_{y1}) + \mu_{y2}(N_{y2}+W_{y2}).$$

In the expression, $\mu_{y1}$ and $\mu_{y2}$ each represent a friction coefficient between the second support portion 48 and the second guiding portion 50, $W_{y1}$ and $W_{y2}$ each represent a load to be applied to the second support portion 48, and $N_{y1}$ and $N_{y2}$ each represent a force to be applied to the second support portion 48 due to the attraction force between the first magnets 58 and 58 and the first magnetic members 60 and 60. Further, the following expression may be satisfied:

$$N+W_y = (N_{y1}+W_{y1}) + (N_{y2}+W_{y2}),$$

and $F_y$ can be represented as follows:

$$F_y = \mu_y(N+W_y),$$

provided that $\mu_y$ is an average value of $\mu_{y1}$ and $\mu_{y2}$.

When the energization to the first coil 82 is canceled after the lens support 20 is moved in any one of the X direction and the Y direction, the lens support 20 stops at a position at which the energization is stopped due to the attraction force between the first magnets 58 and 58 and the first magnetic members 60 and 60, the friction between the first support portion 44 and the first guiding portion 46, and the friction between the second support portion 48 and the second guiding portion 50.

In this case, it is assumed that the camera device 10 receives, for example, impact in a −Y direction. When the camera device 10 receives the impact in the −Y direction, the lens support 20 and the first moving member plate 26 are caused to move in a +Y direction against the attraction force between the first magnets 58 and 58 and the first magnetic members 60 and 60. However, the lens support 20 and the first moving member plate 26 are not separated and hardly move even when receiving impact from the outside because the lens support 20 and the first moving member plate 26 are supported by the first support mechanism 40 so as to regulate the movement in the Y direction. After receiving the impact, the lens support 20 and the first moving member plate 26 are applied with a force of returning the lens support 20 and the first moving member plate 26 in the −Y direction due to the attraction force between the first magnets 58 and 58 and the first magnetic members 60 and 60. Also in this case, the lens support 20 and the first moving member plate 26 hardly move even when receiving impact from the outside because the first support portion 44 and the first guiding portion 46 maintain the contact. With respect to the impact in the X direction, while the contact between the first support portion 44 and the first guiding portion 46 is maintained, only the lens support 20 is guided by the first support mechanism 40 to be moved relative to the first moving member plate 26. Further, also with respect to the impact in the Z direction, the contact between the first support portion 44 and the first guiding portion 46 is easily maintained, but even when the first support portion 44 and the first guiding portion 46 are separated from each other, the impact is received with a surface at the time of return. Therefore, the damage is small, and smooth movement of the lens support 20 can be ensured. The second support mechanism 42 also acts similarly.

Further, in the first support mechanism 40 and the second support mechanism 42, the first support portion 44 and the first guiding portion 46 are fitted to each other in the X direction, and the second support portion 48 and the second guiding portion 50 are fitted to each other in the Y direction, thereby forming independent support mechanisms. Therefore, a force in the rotation direction does not act even with a simultaneous drive in the XY directions, and the lens support 20 can be prevented from being vibrated in the rotation direction.

Next, with energization to the second coil 84 arranged between the second magnet 62 and the second magnetic member 92 in which magnetic fluxes in the Y direction are interposed, currents flow through the second coil 84 in the X direction, and a Lorentz force acts on the second coil 84 in the Z direction by the Fleming's left hand rule. The second coil 84 is fixed to the base 66, and hence the moving member 18 moves in the Z direction while being supported by the optical axis-direction support mechanism 94 with a reaction force acting on the second magnet 62 serving as a drive force for the moving member 18.

In this case, when the drive force in the Z direction is represented by $F_z$, the drive force $F_z$ may satisfy the following expression to drive the moving member 18 in the Z direction:

$$F_z > (\mu_{z3} \times N_{z3} + \mu_{z4} \times N_{z4}) + W.$$

In the expression, $N_z$ represents an attraction force generated by the second magnet 62 ($N_z = N_{z3} + N_{z4}$), $\mu_{z3}$ represents a friction coefficient between the third support portion 96 and the third guiding portion 100, $\mu_{z4}$ represents a friction coefficient between the fourth support portion 98 and the fourth guiding portion 102, and W represents a total weight of the moving member 18.

When the energization to the second coil 84 is canceled after the moving member 18 is moved in the Z direction, the moving member 18 stops at a position at which the energization is stopped due to the attraction force between the second magnet 62 and the second magnetic member 92, the friction between the third support portion 96 and the third guiding portion 100, and the friction between the fourth support portion 98 and the fourth guiding portion 102.

In this case, it is assumed that the camera device 10 receives, for example, impact in the −Y direction. When the camera device 10 receives the impact in the −Y direction, the moving member 18 is caused to move in the +Y direction against the attraction force between the second magnet 62 and the second magnetic member 92. However, the moving member 18 hardly moves even when receiving impact from the outside because Y-direction contact between the third guiding portion 100 and the third support portion 96 and between the fourth guiding portion 102 and the fourth support portion 98 is maintained. After receiving the impact, the moving member 18 is applied with a force of returning the moving member 18 in the −Y direction due to the attraction force between the second magnet 62 and the second magnetic member 92. Also in this case, the moving member 18 hardly moves even when receiving impact from the outside because Y-direction contact between the third guiding portion 100 and the third support portion 96 and between the fourth guiding portion 102 and the fourth support portion 98 is maintained.

In this case, even when the third guiding portion 100 or the fourth guiding portion 102 is slightly deformed, the third support portion 96 and the fourth support portion 98 have a shape extending in the Z direction, and hence a force that is not local but successive acts along the Z direction on the third support portion 96 and the fourth support portion 98. Therefore, abrupt motion change does not occur due to a reciprocating motion of the moving member 18 or the like. Therefore, the smooth movement of the lens support 20 can be ensured.

The moving member 18 is supported by the optical axis-direction support mechanism 94 provided on the Y direction side, and further the moving member 18 is heavy because the first magnets 58 and the like are provided. Therefore, a moment of hanging downward in the Z direction is generated. However, the optical axis-direction support mechanism 94 is supported by the third support portion 96 and the fourth support portion 98 extending in the Z direction, and hence as compared to a case in which balls are used for support as in the related art, the above-mentioned hanging downward can be reduced.

Figure 11:
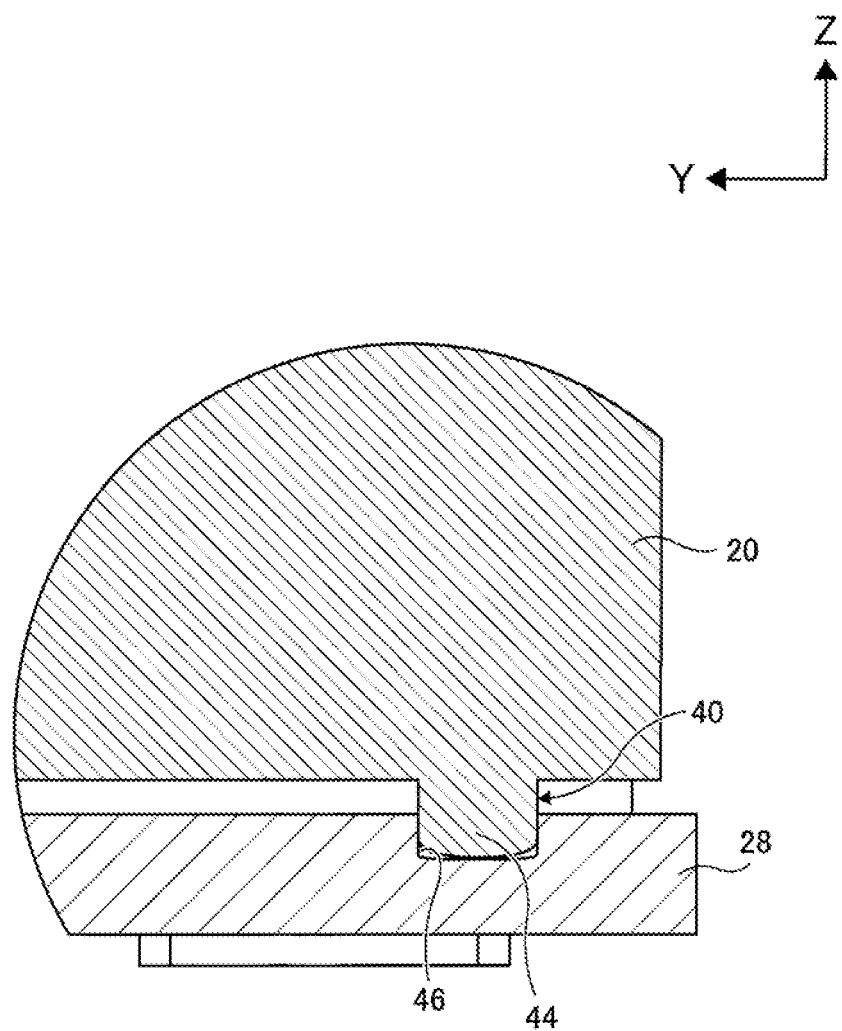
FIG. 11 is a sectional view for illustrating a periphery of a first support mechanism in a camera device according to a second embodiment of the present invention.
Figure 12:
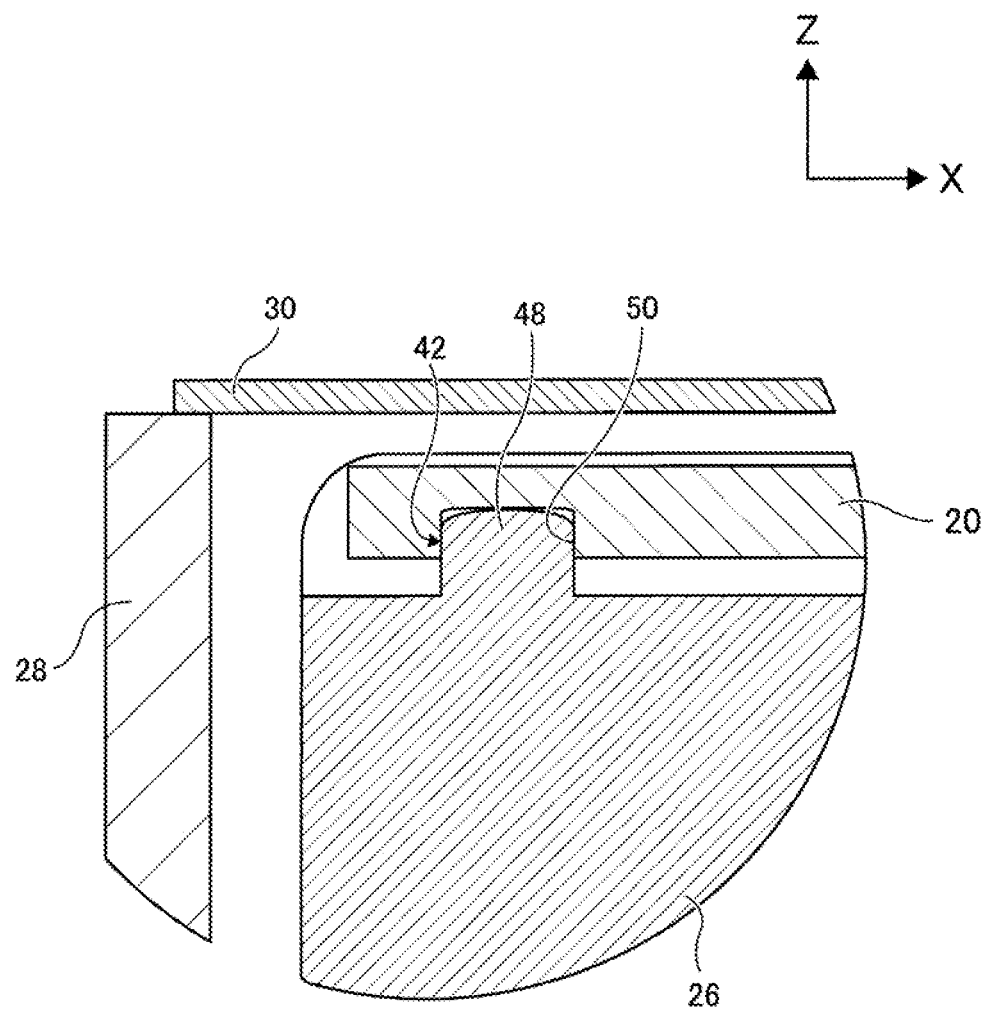
FIG. 12 is a sectional view for illustrating a periphery of a second support mechanism in the camera device according to the second embodiment of the present invention.

FIG. 11 and FIG. 12 are illustrations of a second embodiment of the present invention.

As compared to the above-mentioned first embodiment, the second embodiment differs in the structures of the first support mechanism 40 and the second support mechanism 42.

That is, in the first support mechanism 40, the first support portion 44 is formed so that its lower surface side protrudes in an arc shape. Therefore, in the Z-direction cross section illustrated in FIG. 11, side surfaces of the first support portion 44 and the first guiding portion 46 are brought into line contact with each other, and bottom surfaces thereof are brought into point contact with each other. In the X direction, the side surfaces are brought into surface contact with each other, and the bottom surfaces are brought into line contact with each other. Further, the second support portion 48 is formed so that its upper surface side protrudes in an arc shape. Therefore, in the Z-direction cross section illustrated in FIG. 12, side surfaces of the second support portion 48 and the second guiding portion 50 are brought into line contact with each other, and bottom surfaces thereof are brought into point contact with each other. In the X direction, the side surfaces are brought into surface contact with each other, and the bottom surfaces are brought into line contact with each other.

As described above, in the first support mechanism 40 and the second support mechanism 42, the first support portion 44 and the first guiding portion 46 are brought into surface or line contact with each other in the X direction, and the second support portion 48 and the second guiding portion 50 are brought into surface or line contact with each other in the X direction. Therefore, the friction force can be reduced as compared to that in the first embodiment.

Parts similar to those in the first embodiment are denoted by the same reference symbols, and description thereof is omitted.

Figure 13:
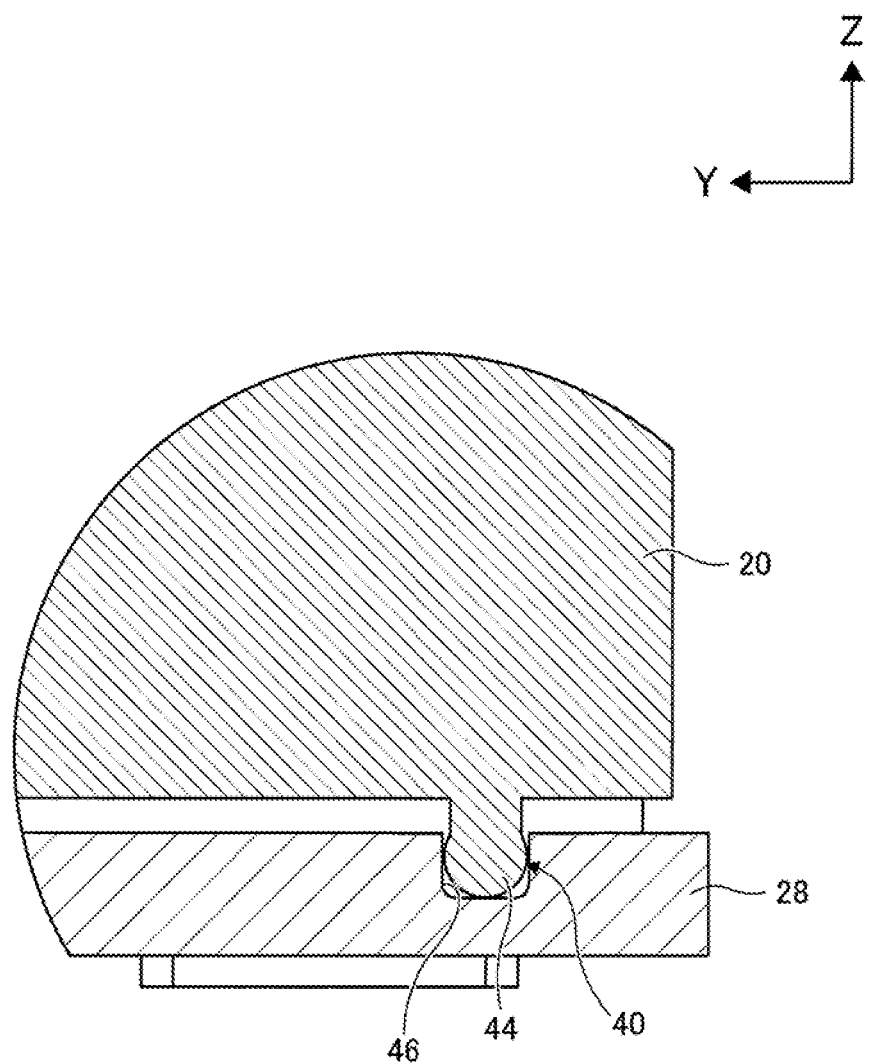
FIG. 13 is a sectional view for illustrating a periphery of a first support mechanism in a camera device according to a third embodiment of the present invention.
Figure 14:
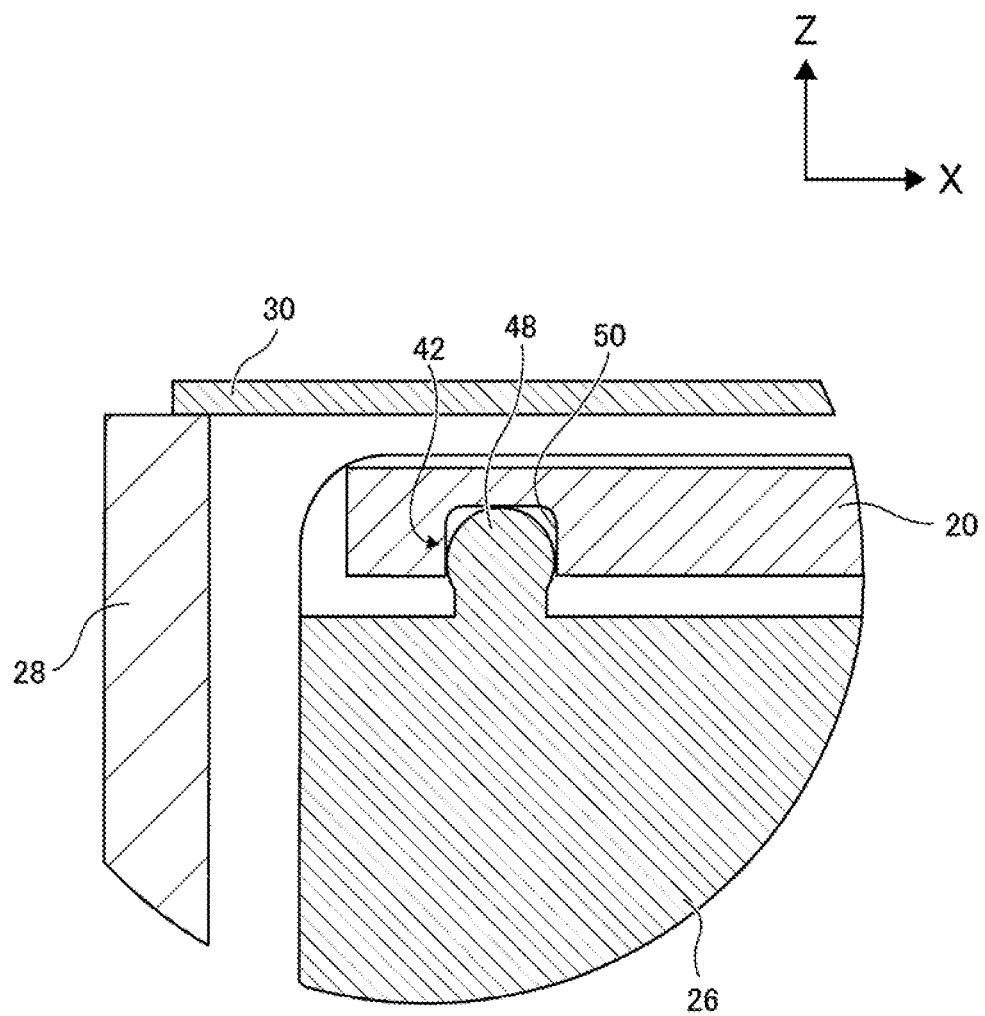
FIG. 14 is a sectional view for illustrating a periphery of a second support mechanism in the camera device according to the third embodiment of the present invention.

FIG. 13 and FIG. 14 are illustrations of a third embodiment of the present invention.

As compared to the above-mentioned first embodiment, the third embodiment differs in the structures of the first support mechanism 40 and the second support mechanism 42.

That is, in the first support mechanism 40, the first support portion 44 is formed so that its lower surface side protrudes in an arc shape. Therefore, in the Z-direction cross section illustrated in FIG. 13, side surfaces and bottoms surfaces of the first support portion 44 and the first guiding portion 46 are brought into point contact with each other. In the X direction, line contact is achieved at three points of the side surfaces and the bottom surface. Further, the second support portion 48 is formed so that its upper surface and side surface sides protrude in an arc shape. Therefore, in the Z-direction cross section illustrated in FIG. 14, the side surfaces and the bottom surfaces of the second support portion 48 and the second guiding portion 50 are brought into point contact with each other. In the X direction, line contact is achieved at three points of the side surfaces and the bottom surface. In the third embodiment, in the Z-direction cross section, point contact is achieved in both side surfaces, but point contact may be achieved only in one side surface.

As described above, in the first support mechanism 40 and the second support mechanism 42, the first support portion 44 and the first guiding portion 46 are brought into contact with each other at three points in the X direction, and the second support portion 48 and the second guiding portion 50 are brought into contact with each other at three points in the X direction. Therefore, the friction force can be further reduced as compared to that in the second embodiment.

Parts similar to those in the first and second embodiments are denoted by the same reference symbols, and description thereof is omitted.

Figure 15:
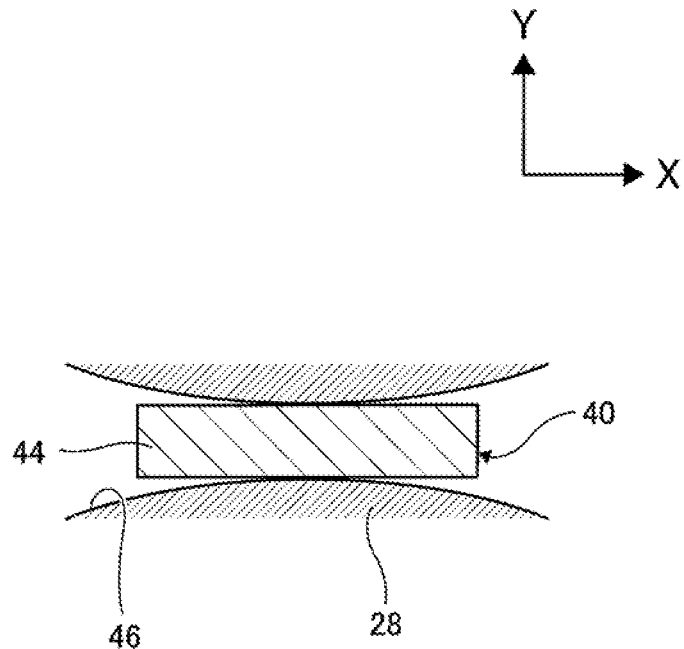
FIG. 15 is an XY-direction sectional view for illustrating a first support mechanism in a camera device according to a fourth embodiment of the present invention.

FIG. 15 is an illustration of a fourth embodiment of the present invention.

In the fourth embodiment, the first support portion 44 has a linear side surface, but the first guiding portion 46 has a shape of protruding in a curved shape. Therefore, the first support portion 44 and the first guiding portion 46 are brought into point contact with each other in the XY-direction cross section.

Figure 16:
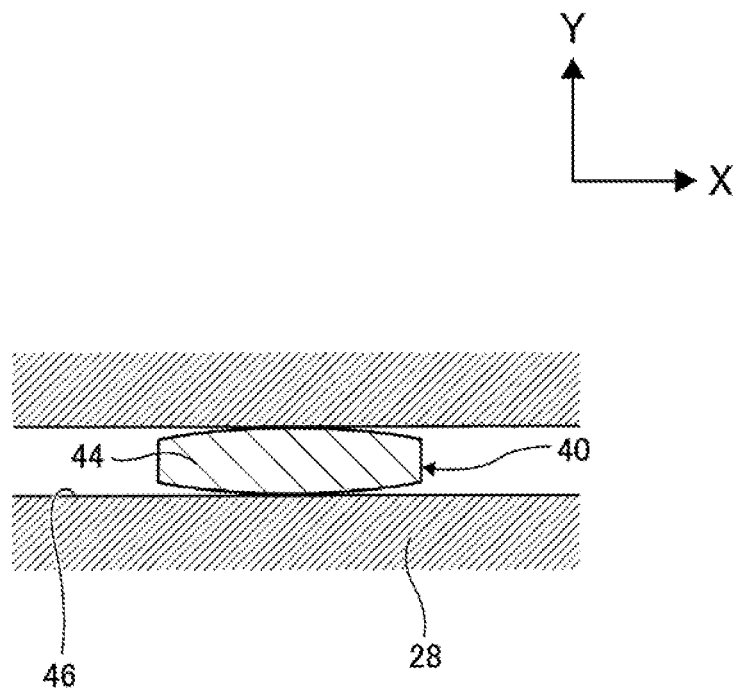
FIG. 16 is an XY-direction sectional view for illustrating a first support mechanism in a camera device according to a fifth embodiment of the present invention.

FIG. 16 is an illustration of a fifth embodiment of the present invention.

In the fifth embodiment, the first guiding portion 46 has a linear side surface, but the first support portion 44 has a shape of protruding in a curved shape. Therefore, the first support portion 44 and the first guiding portion 46 are brought into point contact with each other in the XY-direction cross section.

In the description above of the embodiments, a part formed into a protruding shape is referred to as the support portion, and a part formed into a recessed shape is referred to as the guiding portion, but the protruding part may be referred to as the guiding portion, and the recessed part may be referred to as the support portion. Further, the configurations of the first to fifth embodiments may be combined as appropriate.

The first magnet 58 and the first coil 82, and the second magnet 62 and the second coil 84 may be arranged at interchanged positions. In this case, other members are optimally rearranged as appropriate. Further, the lens driving device 12 has a focus adjusting function and an image stabilization function, but may further have a zoom function, for example. The lens driving device 12 to be used in the camera device 10 is described herein, but the present invention is also applicable to other devices.

The invention claimed is:

1. A lens driving device, comprising:
  a lens support configured to support a lens;
  a frame member surrounding a periphery of the lens support; and
  a support mechanism configured to support the lens support so as to be freely movable relative to the frame member in a direction orthogonal to an optical axis direction of the lens,
  the support mechanism including a support portion and a guiding portion,
  the support portion being formed in a protruding manner toward the optical axis direction of the lens while the guiding portion being formed in a recessed manner toward the optical axis direction so as to fit over the support portion,
  the support portion and the guiding portion extending along the direction orthogonal to the optical axis direction of the lens,
  the support portion being in contact with the guiding portion at least at two points on both sides of the support portion when viewed from an extending direction of the guiding portion in a cross section that is parallel to the optical axis direction of the lens and is orthogonal to the extending direction of the guiding portion.

2. The lens driving device according to claim 1,
  wherein the support mechanism includes a first support mechanism provided on one side in the optical axis direction of the lens, and a second support mechanism provided on another side in the optical axis direction of the lens,
  wherein the first support mechanism includes a first support portion and a first guiding portion,
  wherein the second support mechanism includes a second support portion and a second guiding portion,
  wherein the first support portion and the first guiding portion extend in one direction orthogonal to the optical axis direction of the lens, and
  wherein the second support portion and the second guiding portion extend in a direction orthogonal to the optical axis direction of the lens and orthogonal to the first support portion and the first guiding portion.

3. The lens driving device according to claim 2, wherein the support portion and the guiding portion are at least partially in surface contact with each other in the direction orthogonal to the optical axis direction of the lens.

4. The lens driving device according to claim 3, wherein the support portion and the guiding portion are configured so that the support portion is in line contact with the guiding portion at three positions in the direction orthogonal to the optical axis direction of the lens.

5. The lens driving device according to claim 4, further comprising:
a magnet provided in the lens support; and
a magnetic member provided in the frame member and opposed to the magnet.

6. The lens driving device according to claim 3, further comprising:
a magnet provided in the lens support; and
a magnetic member provided in the frame member and opposed to the magnet.

7. The lens driving device according to claim 2, wherein the support portion and the guiding portion are configured so that the support portion is in line contact with at least a part of the guiding portion in the direction orthogonal to the optical axis direction of the lens.

8. The lens driving device according to claim 7, further comprising:
a magnet provided in the lens support; and
a magnetic member provided in the frame member and opposed to the magnet.

9. The lens driving device according to claim 2, further comprising:
a magnet provided in the lens support; and
a magnetic member provided in the frame member and opposed to the magnet.

10. The lens driving device according to claim 1, wherein the support portion and the guiding portion are at least partially in surface contact with each other in the direction orthogonal to the optical axis direction of the lens.

11. The lens driving device according to claim 10, wherein the support portion and the guiding portion are configured so that the support portion is in line contact with the guiding portion at three positions in the direction orthogonal to the optical axis direction of the lens.

12. The lens driving device according to claim 11, further comprising:
a magnet provided in the lens support; and
a magnetic member provided in the frame member and opposed to the magnet.

13. The lens driving device according to claim 10, further comprising:
a magnet provided in the lens support; and
a magnetic member provided in the frame member and opposed to the magnet.

14. The lens driving device according to claim 1, wherein the support portion and the guiding portion are configured so that the support portion is in line contact with at least a part of the guiding portion in the direction orthogonal to the optical axis direction of the lens.

15. The lens driving device according to claim 14, further comprising:
a magnet provided in the lens support; and
a magnetic member provided in the frame member and opposed to the magnet.

16. The lens driving device according to claim 1, further comprising:
a magnet provided in the lens support; and
a magnetic member provided in the frame member and opposed to the magnet.

17. The lens driving device according to claim 1,
wherein the frame member includes a first frame member surrounding a periphery of the lens support and a second frame member surrounding the first frame member,
wherein the support mechanism includes an orthogonal-direction support mechanism configured to support the lens support so as to be freely movable relative to the first frame member in a direction orthogonal to an optical axis direction of the lens, and an optical axis-direction support mechanism configured to support the lens support and the first frame member so as to be freely movable in the optical axis direction of the lens,
the orthogonal-direction support mechanism including a support portion and a guiding portion.

18. The lens driving device according to claim 17,
wherein the optical axis-direction support mechanism includes a second frame member-side support portion provided in the second frame member and a first frame member-side guiding portion provided in the first frame member,
wherein the second frame member-side support portion extends in the optical axis direction of the lens, and
wherein the second frame member-side support portion is in contact with the first frame member-side guiding portion at least at two points in a cross section in the direction orthogonal to the optical axis direction of the lens.

19. A camera device, comprising:
the lens driving device of claim 1; and
a lens supported by the lens support.

20. An electronic apparatus, comprising the camera device of claim 19.

* * * * *